United States Patent
Wipf

(10) Patent No.: US 9,485,903 B1
(45) Date of Patent: Nov. 8, 2016

(54) SEED BOOT MOUNTING SYSTEM

(71) Applicant: Danny Wipf, Lake Andes, SD (US)

(72) Inventor: Danny Wipf, Lake Andes, SD (US)

( * ) Notice: Subject to any disclaimer, the term of this patent is extended or adjusted under 35 U.S.C. 154(b) by 0 days.

(21) Appl. No.: 14/605,194

(22) Filed: Jan. 26, 2015

(51) Int. Cl.
*A01C 7/04* (2006.01)
*A01C 7/20* (2006.01)
*A01C 7/08* (2006.01)

(52) U.S. Cl.
CPC ............... *A01C 7/201* (2013.01); *A01C 7/081* (2013.01); *A01C 7/206* (2013.01)

(58) Field of Classification Search
CPC .......... A01C 7/04; A01C 7/06; A01C 7/081; A01C 7/206
USPC .................................................. 111/174–182
See application file for complete search history.

(56) References Cited

U.S. PATENT DOCUMENTS

| | | | | | |
|---|---|---|---|---|---|
| 2,299,392 | A | * | 10/1942 | Johnson | B60G 11/12 267/264 |
| 4,760,806 | A | * | 8/1988 | Bigbee | A01C 7/203 111/135 |
| 7,856,934 | B2 | * | 12/2010 | Hagny | A01C 5/064 111/163 |
| 8,616,140 | B1 | * | 12/2013 | Wipf | A01C 5/062 111/174 |
| 2015/0075826 | A1 | * | 3/2015 | Ryan | A01C 5/062 172/762 |
| 2015/0334915 | A1 | * | 11/2015 | Mead | A01C 5/064 111/170 |

\* cited by examiner

*Primary Examiner* — John G Weiss
(74) *Attorney, Agent, or Firm* — Jeffrey A. Proehl; Woods, Fuller, Shultz & Smith, P.C.

(57) ABSTRACT

A system comprising an air seeder assembly has a base mount with base ears including a first pair of base bores and defining a channel therebetween with a channel width. The assembly comprising a seed boot removably mountable on the base mount, and having a pair of boot ears with a first pair of boot bores. A seed boot stabilizer is mountable on the seed boot and the base mount and positionable in the channel between the seed boot and the base mount. The boot stabilizer has a primary portion with a first stabilizer bore alignable with the first pair of base bores in the base ears. A fastener structure may extending through the pair of base bores of the base ears, the pair of boot bores of the boot ears and the stabilizer bore to fasten the stabilizer to the seed boot and the base mount.

19 Claims, 8 Drawing Sheets

SEED BOOT MOUNTING SYSTEM

BACKGROUND

1. Field

The present disclosure relates to seed boot structures and more particularly pertains to a new seed boot mounting system for providing a stable mounting for the seed boot even when mounting holes have become worn.

2. Description of the Prior Art

Air seeder apparatus are used to move seed for planting from a bin of seeds to a furrow formed in the ground for the purpose of planting the seed for growing crop. The air seeder apparatus may include a seed boot for each row that the air seeder apparatus is capable of planting in one pass of the apparatus across the field. The seed boot includes a passage or channel through which the seed is moved from the seed supply container to the furrow. The bottom end of the seed boot is positioned in close proximity to the ground and the furrow, and is subject to contact with the ground that places stress on the structure mounting the boot to the base mount of the apparatus. The seed boot may be connected to the base mount by a pin, such as a bolt fastener, that passes through ears or tabs that extend from the base mount and the seed boot. The fastener passes through holes in the ears to hold the boot to the base mount, with some degree of pivot movement of the boot being possible. FIG. 1 of the drawings provides an illustration of the prior structure.

Due to the forces applied to the boot by contact with the ground, the mount is subject to significant wear over a planting season. The seed boot may be easily removed from and replaced on the air seeder apparatus, but this can be expensive, and rebuilding the mount structure on the main seeder apparatus is not as easily accomplished and thus presents a greater challenge. Some highly suitable solutions are disclosed in U.S. Pat. Nos. 8,141,503 and 8,616,140, which are hereby incorporated by reference in their entireties, but such approaches do not have some of the advantages of the present disclosure.

SUMMARY

In one aspect, the present disclosure relates to a seed planter system comprising an air seeder assembly comprising a base mount having a body, and a pair of base ears extending from the body defining a channel therebetween having a channel width. The base ears may have a first pair of base bores. The air seeder assembly may comprise a seed boot removably mountable on the base mount, and the seed boot may have a pair of boot ears with a first pair of boot bores. The system may also include a seed boot stabilizer mountable on the seed boot and the base mount, with the seed boot stabilizer being positionable in the channel between the seed boot and the base mount. The boot stabilizer may have a primary portion with a first stabilizer bore alignable with the first pair of base bores in the base ears. A fastener structure may extend through the first pair of base bores of the base ears, the first pair of boot bores of the boot ears and the first stabilizer bore to fasten the seed boot stabilizer to the seed boot and the base mount.

In another aspect, the disclosure may relate to a method of reducing wear on an air seeder assembly comprising removing a seed boot from a base mount of an air seeder assembly, positioning a seed boot stabilizer on the base mount in a channel formed between base ears of the base mount, positioning the seed boot on the base mount with boot ears of the seed boot being positioned adjacent to the base ears, and extending a fastener through aligned bores of the seed boot, the base mount, and the seed boot stabilizer to connect the elements.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
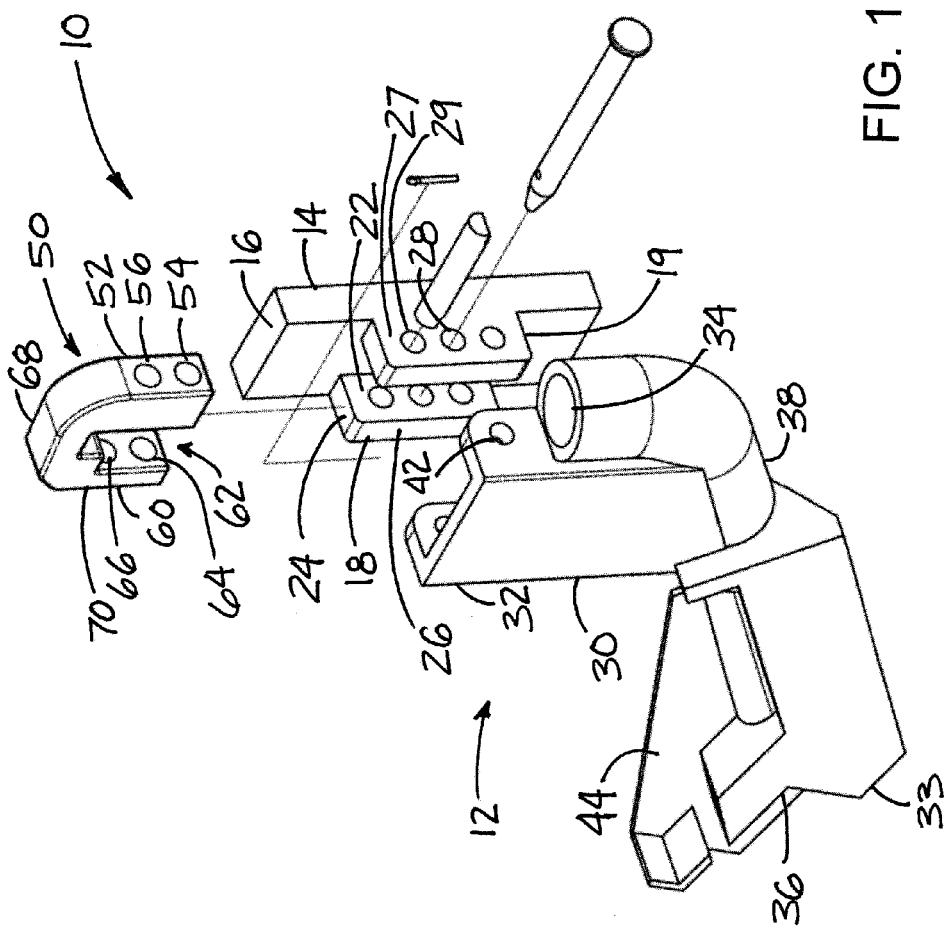
FIG. 1 is a schematic perspective exploded view of a seed boot and base mount with an embodiment of the new seed boot mounting system according to the present disclosure.

With reference now to the drawings, and in particular to FIGS. 1 through 8 thereof, a new seed boot mounting system embodying the principles and concepts of the disclosed subject matter will be described.

The applicant has recognized that while the approaches to seed boot mount reconditioning disclosed in U.S. Pat. Nos. 8,141,503 and 8,616,140 are highly useful, there are some potential drawbacks particularly when there is some reticence to enlarge one or more of the bores of the seed boot assembly. The applicant has thus developed an approach that does not require the enlargement of the bores, but instead utilizes a stabilizer element that stabilizes the mounting of the seed boot on the base mount.

In one aspect, the disclosure generally relates to a seed planter system 10 which may include an air seeder assembly 12 that includes a base mount 14 and seed boot 30, and a seed boot stabilizer mounted on the base mount and seed boot. The air seeder assembly is generally mounted on and supported above the ground by an agricultural implement that is towed behind a tractor, and an assembly 12 is included for each row to be planted per pass of the implement across the field.

In greater detail, the air seeder assembly 12 may comprise a base mount 14 which generally forms a portion of the agricultural planter implement and a seed boot 30 which is removably mountable on the base mount. The base mount 14 may have a body 16 and at least one base ear that extends from the body. In most embodiments a pair of base ears 18, 19 are utilized and extend from the body in a generally parallel orientation with respect to each other. The pair of base ears 18, 19 may define a channel 20 therebetween, and the channel may have a channel width that is defined between opposing inner surfaces 22 of the pair of base ears. The base ears may also have an upper surface 24, as well as a side surface 26 generally located opposite of the body 16. The side surfaces 26 of the ears may be oriented in substantially the same plane. At least one of the base ears may have an outer surface 27 that is located opposite of the inner surface of the said base ear. The base ears may be oriented in a spaced, substantially parallel arrangement such that the width of the channel may not vary significantly along the lengths of the base ears.

Each base ear 18, 19 may have a base bore 28, and the base bores of the ears may be axially aligned with each other such that a fastener may extend into both bores simultaneously. In some embodiments, the base bores include a first pair 28 of base bores, and in many embodiments a second pair 29 of base bores, and even a third pair of base bores, may be included. The first pair of base bores may be positioned between the second pair and third pair of base bores. The pairs of base bores may provide some degree of adjustment of the mounting of the seed boot on the base mount.

The seed boot 30 is removably mountable on the base mount and may have an upper end 32 as well as a lower end 33. The seed boot may define a passage 34 through which a seed moves from a seed delivery system to a furrow in the ground. The passage may generally extend from the upper end 32 toward the lower end 33, with the passage having an outlet end 36 located generally adjacent to the lower end. The seed boot may thus comprise a conduit portion 38 which defines the passage, and the conduit portion may generally extend from the upper end 32 of the seed boot toward the lower end 33.

The seed boot 30 may have at least one boot ear 40 positioned adjacent to the upper end 32 of the seed boot and adjacent to the conduit portion. In some of the most preferred embodiments, the seed boot 30 includes a pair of boot ears 40, 41 which extend generally in a spaced and substantially parallel arrangement with respect to each other. Each boot ear may have a boot bore extending therethrough and being generally aligned with each other. Illustratively, the boot ears may include a first pair of boot bores 42 and, in some embodiments, a second pair of boot bores. The seed boot 30 may also include a guide plate 44 which may extend at least from the outlet end 36 of the conduit portion towards the lower end 33 of the seed boot. The guide plate may be configured such that it has a substantially vertical orientation when the seed boot is mounted on a base mount, and the guide plate may have a rear edge 46 which is generally oriented rearwardly when the seed boot is so mounted. The seed boot may also have a mount surface 48 which may be formed on the conduit portion of the boot in a location generally adjacent to the guide plate 44.

Figure 2:
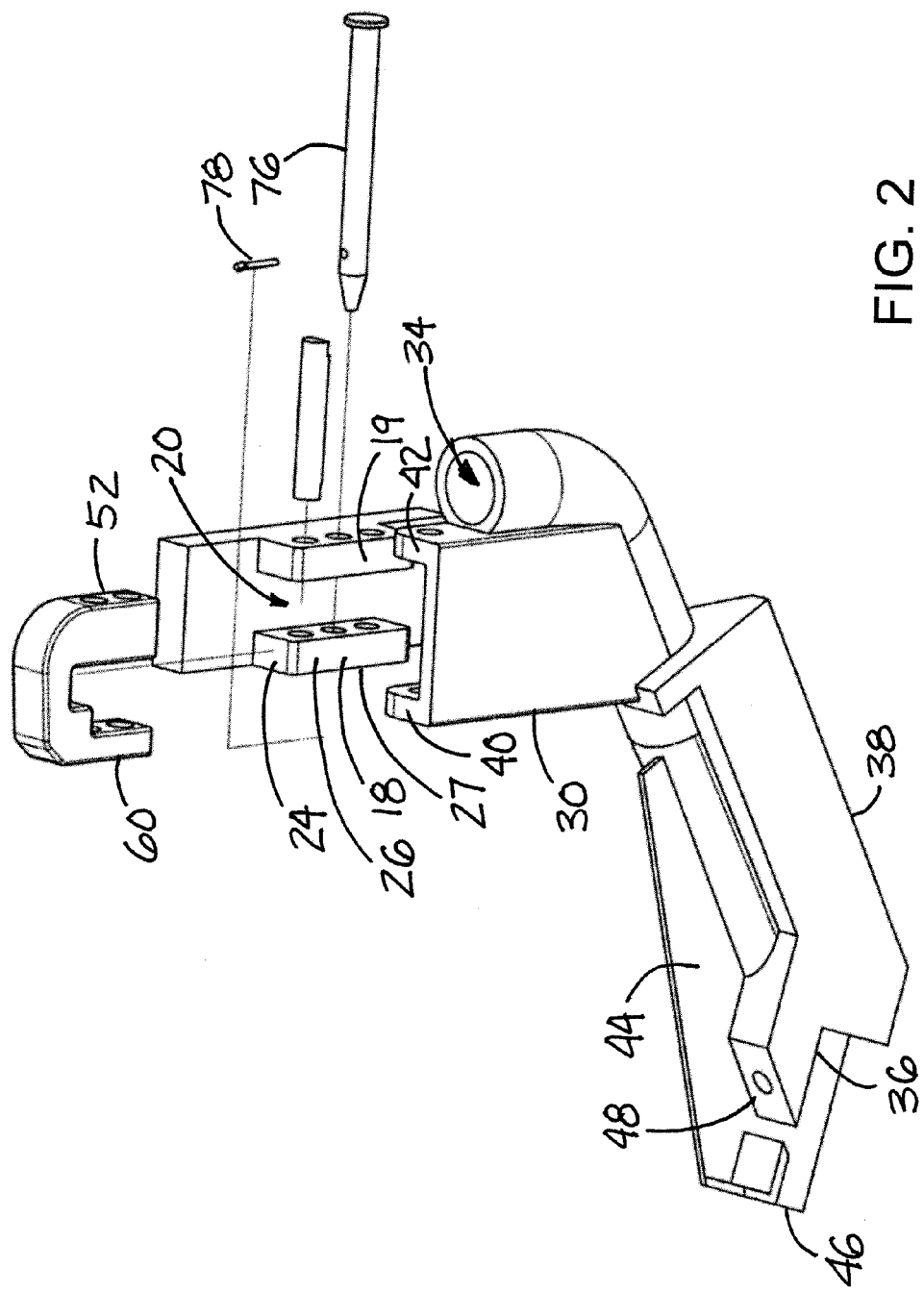
FIG. 2 is a schematic perspective view of the assembly shown in FIG. 1, according to an illustrative embodiment.
Figure 3:
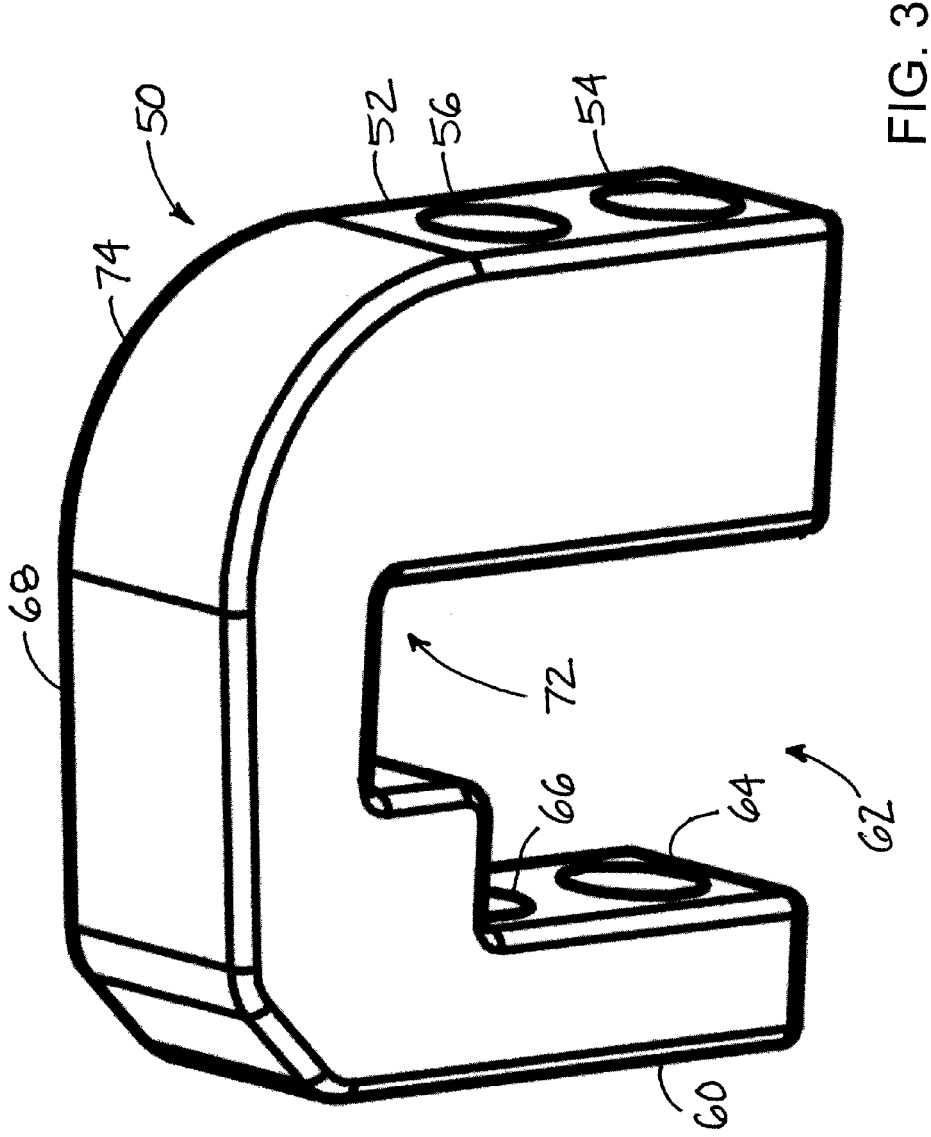
FIG. 3 is a schematic perspective view of the seed boot stabilizer embodiment shown in FIGS. 1 and 2.
Figure 4:
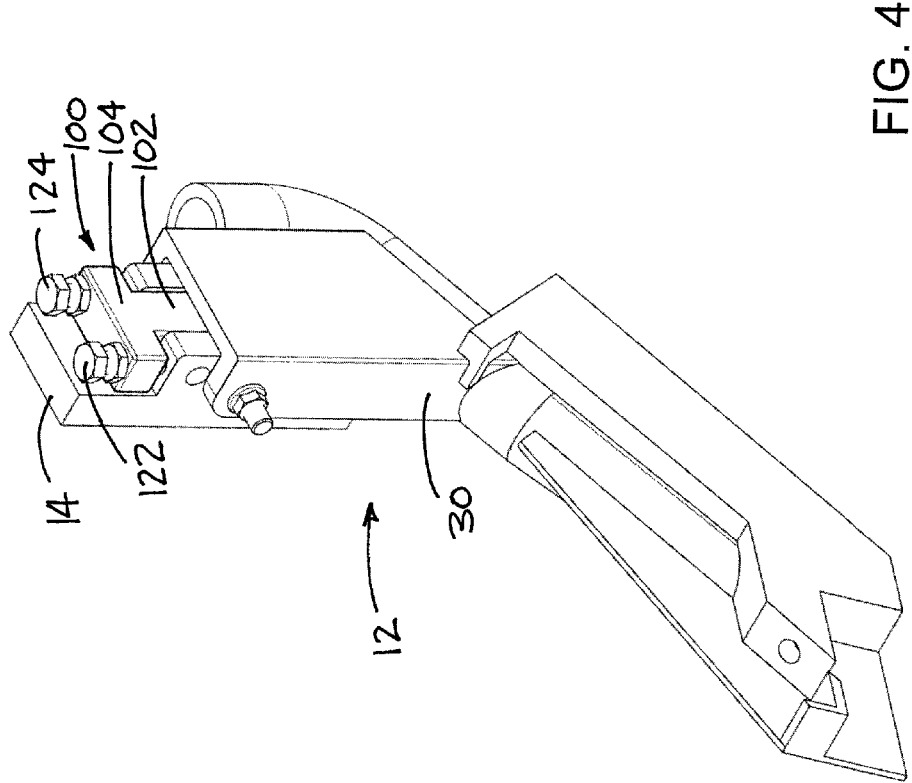
FIG. 4 is a schematic perspective view of a seed boot and base mount with another embodiment of the seed boot stabilizer, according to an illustrative embodiment.
Figure 5:
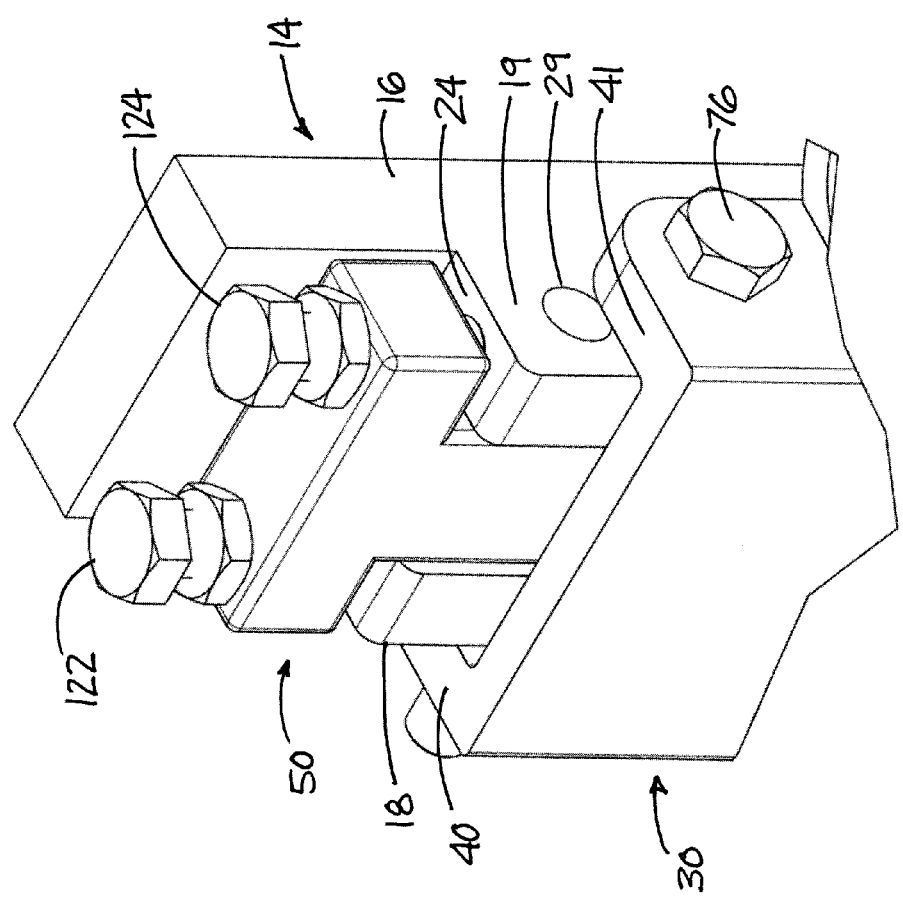
FIG. 5 is a schematic enlarged fragmentary perspective view of a seed boot and base mount with the embodiment of the seed boot stabilizer in FIG. 4.
Figure 6:
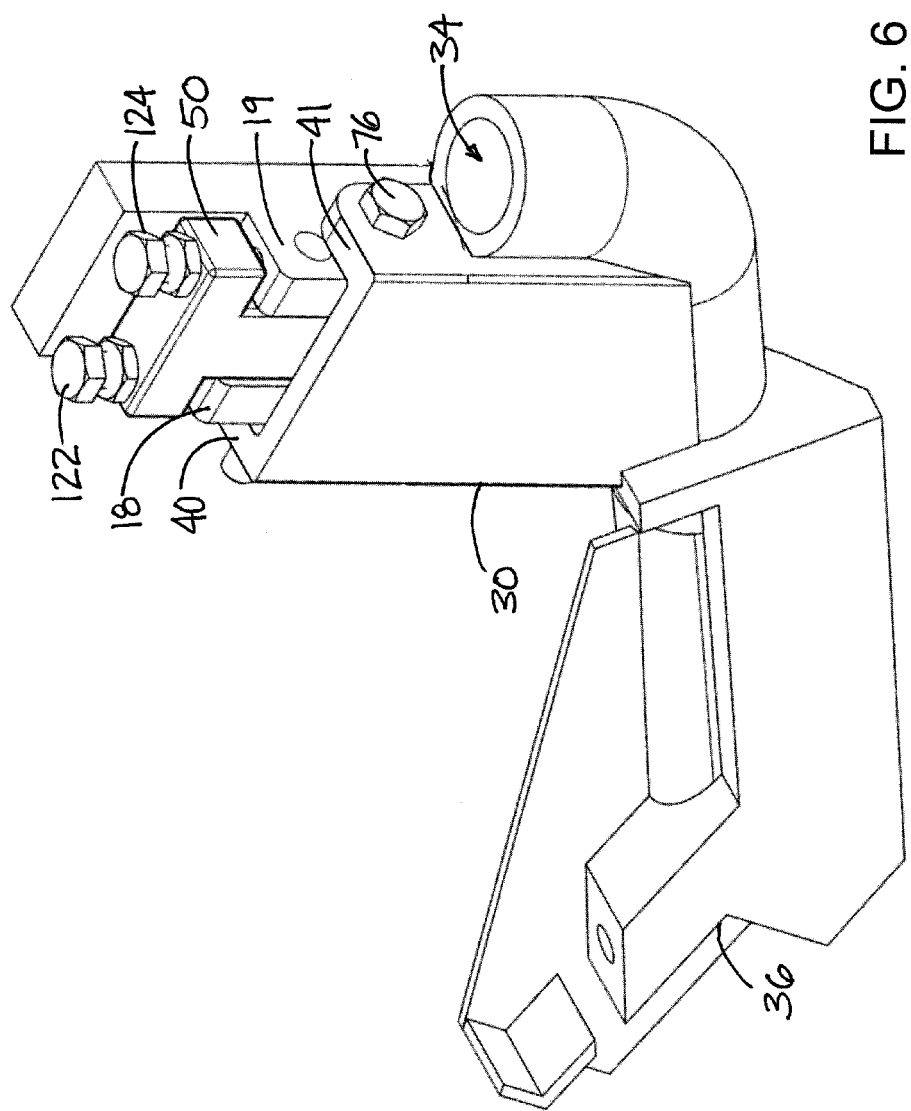
FIG. 6 is a schematic perspective view of a seed boot and base mount with the embodiment of the seed boot stabilizer in FIG. 4.
Figure 7:
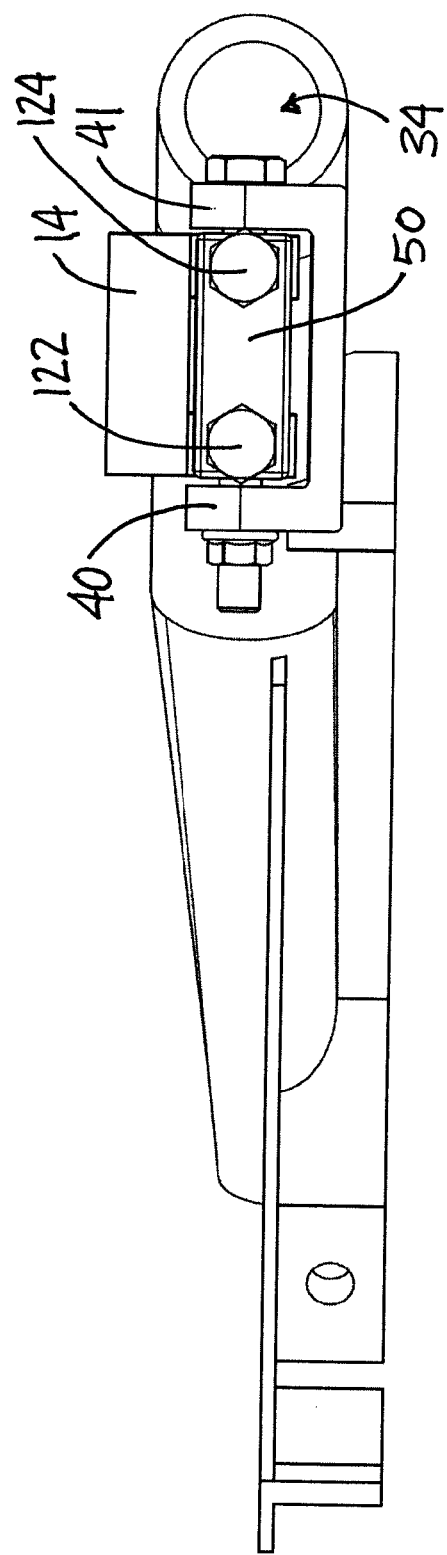
FIG. 7 is a schematic top view of the seed boot and base mount with the seed boot stabilizer embodiment of FIG. 4.
Figure 8:
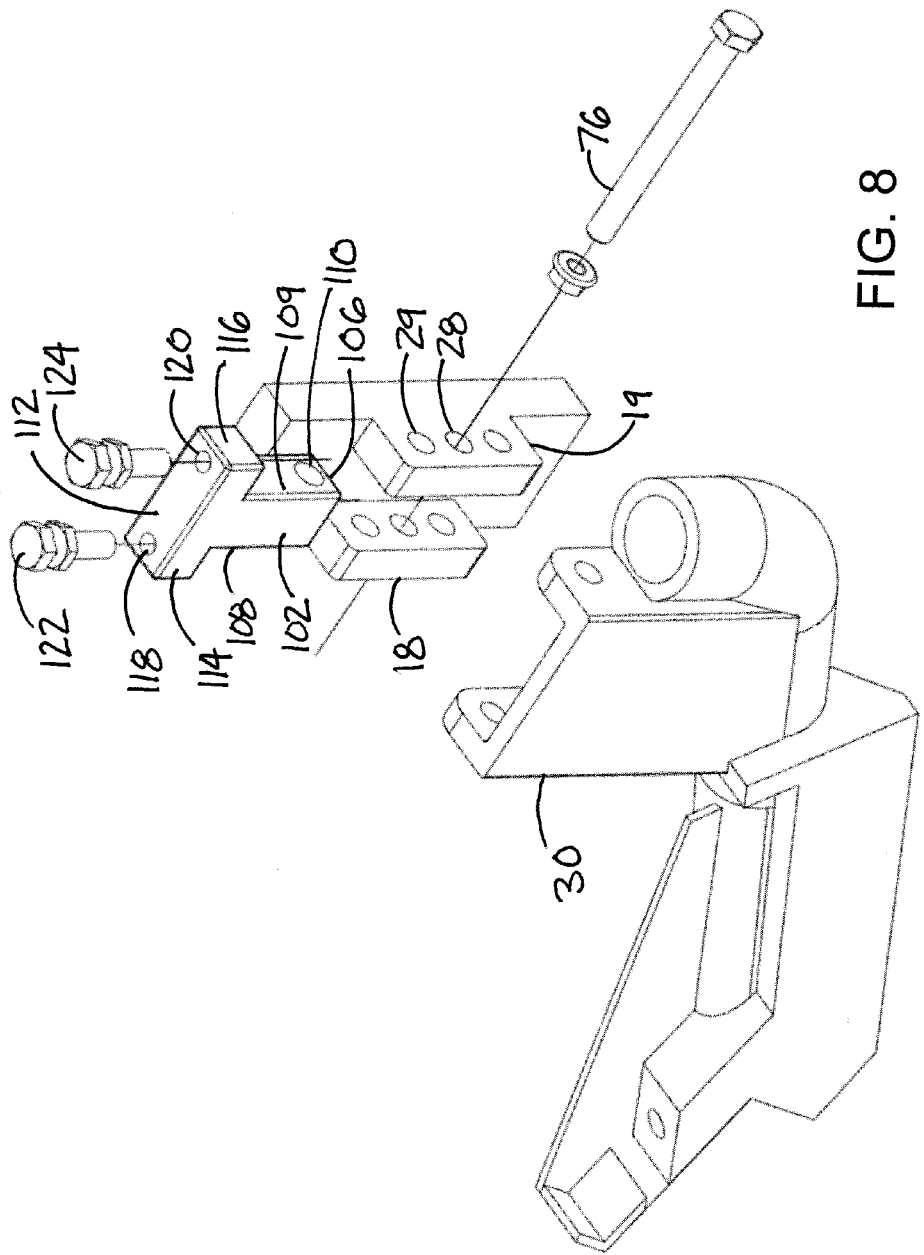
FIG. 8 is a schematic exploded perspective view of the seed boot, base mount and stabilizer assembly of FIG. 4.

One embodiment of the seed boot stabilizer 50 of the air seed assembly 12 is shown in FIGS. 1 through 3, and the stabilizer 50 may be mountable on the seed boot 30 and the base mount 14. In some embodiments, the seed boot stabilizer 50 is positionable between the seed boot and the base mount, and may be positioned between the base ears 18, 19 in the channel 20, and the base ears are in turn positionable between the boot ears 40, 41 of the seed boot 30. The boot stabilizer 50 may include a primary portion 52 and optionally a secondary portion 60. The primary portion 52 may be configured to be positioned in the channel 20 of the base mount, and the primary portion may have a width that is substantially equal to the channel width of the base mount to permit a substantially snug fit of the primary portion 52 between the base ears 18, 19 when the stabilizer 50 is mounted on the air seeder assembly 12.

The primary portion 52 of the stabilizer may be elongated in a direction that is substantially perpendicular to the width direction of the primary portion. The primary portion 52 may have a first stabilizer bore 54 which is alignable with the first pair 28 of base bores formed in the base ears, and optionally the primary portion may also have a second stabilizer bore 56 which is alignable with the second pair 29 of the base bores and the base ears. When at least one of the bores of the primary portion is aligned with the base bores of the base mount, the primary portion may extend beyond the upper surfaces 24 of the base ears, and may protrude through a plane that is generally defined by the upper surfaces of the base ears.

The secondary portion 60 may extend from the primary portion 52, and may form a gap 62 with respect to the primary portion for receiving a portion of one of the base ears of the base mount, and also may receive one of the boot ears of the seed boot. The secondary portion may have a third stabilizer bore 64 which is positioned in substantial axial alignment with the first stabilizer bore 54 in the primary portion, and optionally a fourth stabilizer bore 66 may also be formed in the secondary portion in substantial axial alignment with the second stabilizer bore 56 in the primary portion.

In greater detail, the secondary portion 60 may include an offset section 68 which extends from the primary portion, and the offset section may extend in a direction that is substantially perpendicular to the elongated dimension of the primary portion. The offset section may also extend from the primary portion in a direction that is substantially parallel to the first stabilizer bore. The secondary portion may also include a return section 70 which extends from the offset section 68 to form the gap 62 with the primary portion 52. The third stabilizer bore may be formed in the return section 70 and in embodiments including the fourth stabilizer bore, the fourth stabilizer bore may also be formed in the return section. Optionally, a concavity 72 may be formed in the stabilizer 50 at a juncture 74 of the primary 52 and secondary 60 portions, and the concavity may extend into the primary portion and the offset section 68 of the secondary portion. The presence of the concavity can be advantageous for creating clearance around one of the base ears of the base mount.

The seed planter system may also include a fastener structure that is removably extendable through a pair of the base bores of the base ears as well as the boot bores of the boot ears to fasten the seed boot to the base mount, as well as fastening the stabilizer 50 to the base mount and boot. In the illustrative embodiment, the fastener structure comprises a bolt 76 for extending through the base bores and the boot bores as well as one or two of the stabilizer bores. A lock pin 78 may be removably mounted on the bolt, such as extending through a hole formed through the bolt in order to retain the bolt in the bores of the ears as well as a stabilizer. Illustratively, the bolt does not include a threaded exterior surface, or at least does not utilize a threaded exterior surface for mounting a nut, and relies upon the lock pin 78 to resist unintended removal of the bolt from the bores. Optionally, a threaded bolt and nut combination may be utilized as the fastener structure, although that option is not as preferred as over tightening of a nut on the bolt may pinch and damage the ears.

In another aspect, the disclosure relates to a method of reducing wear on an air seeder assembly of a seed planter system. The method may include providing an air seeder assembly 12 having some or all of the elements and characteristics described in this disclosure. The method may also include providing a seed boot stabilizer having some or all of the elements and characteristics also set forth in this disclosure.

The method may also include removing the seed boot from the base mount when the seed boot is in a mounted condition on the base mount. The removal may include removing a fastener from the base bores and the boot bores to free the seed boot from the base mount. The method may also include positioning the seed boot stabilizer on the base mount, and may include positioning the primary portion of the seed boot stabilizer between the base ears of the base mount, and in the channel 20 of the base mount. The method may also include aligning at least one bore in the seed boot stabilizer with one pair of bores of the base mount, such as, for example, aligning the first stabilizer bore 54 of the primary portion with the first pair 28 of base bores in the base ears. Typically, this will align the third stabilizer bore 64 also with the first pair 28 of the base bores. In some implementations, the second stabilizer bore 56 as well as the fourth stabilizer bore 66 may correspondingly be aligned with the second pair 29 of the base bores in the base ears.

The method may also include positioning the seed boot on the base mount which in turn may position the stabilizer between the base mount and the seed boot. This step may include positioning one of the boot ears on one side of the base ears and another one of the boot ears on another side of the base ears such that the base ears of the base mount are positioned between the boot ears of the boot mount. The return section 70 of the secondary portion 60 of the boot stabilizer may be positioned outboard or outside of both the base ears as well as the boot ears. The method may also include extending the fastener structure through the aligned bores of the seed boot, the base mount, and the seed boot stabilizer to hold the parts together and in the desired alignment. Optionally, another step of the method may include mounting the seed firmer on the seed boot including mounting the main portion, such as a section near the mount end, to the seed boot such that the free end and a portion adjacent to the free end of the seed firmer extends beyond the guide plate of the seed boot. Significantly, no boring or other alteration of the bores of the boot or base mount needs to be performed, even if the bores are work or misshapen.

Another embodiment of the seed boot stabilizer 100 is shown in FIGS. 4 through 8 of the drawings. The seed boot stabilizer 100 is also mountable on the seed boot 30 and the base mount 14, and is generally positionable between the seed boot and the base mount. At least a portion of the seed boot stabilizer 100 may be positionable between the base ears 18, 19 of the base mount and in the channel 20. The boot stabilizer 100 may include a primary portion 102 configured to primarily be positioned in the channel 22 of the base mount. The primary portion 102 may have a width that is substantially equal to the channel width of the base mount to permit a substantially snug fit of the primary portion between the base ears, although in some embodiments the fit may have a degree of looseness between these elements. The primary portion 102 may be elongated in a direction that is substantially perpendicular to its width dimension, and may be oriented substantially parallel to the length of the channel 20. The primary portion may have an upper end 104 and a lower end 106 with a longitudinal axis extending between the upper and lower ends, and may also have opposite sides 108, 109 generally extending between the upper and lower ends. The primary portion may have a first stabilizer bore 110 which is alignable with the first pair 28 of the base bores in the base ears 18, 19, and may extend between the opposite sides 108, 109. The primary portion may extend beyond the upper surfaces 24 of the base ears, and may thus protrude through a plane defined by the upper surfaces.

The seed boot stabilizer 100 may also include a secondary portion 112 that extends from the primary portion, and may extend substantially transversely with respect to the longitudinal axis and length of the primary portion. The secondary portion 112 may be positioned at the upper end 104 of the primary portion, and may extend beyond each of the sides 108, 109 of the primary portion. In some embodiments, the stabilizer 100 may be substantially "T" shaped. The primary 102 and secondary 112 portions may be integral with each other and formed of a single piece of material. The secondary portion 112 may include a first section 114 that extends beyond one of the sides of the primary portion and a second section 116 that extends beyond another side of the primary portion. A first bore 118 may extend into and through the first section 114 of the secondary portion, and the first bore may be threaded. A second bore 120 may extend into and through the second section 116 of the secondary portion and may also be threaded. The first bore 118 and the second bore 120 may extend along axes that extend substantially parallel to the longitudinal axis of the primary portion as well as the channel and the length of the base ears 18, 19. When the stabilizer 100 is positioned for use on the base mount, the first section 114 and the first bore 118 may be positioned adjacent to the upper surface 24 of one base ear 18, and the second section 116 and the second bore 120 may be positioned adjacent to the other base ear 19.

A first pressure element 122 may be mounted on the first section 114 of the secondary portion, and may be configured to apply pressure on one of the base ears 18 of the base mount. The first pressure element 122 may be configured to exert an adjustable degree of pressure on the base ear. The first pressure element 122 may be positioned in the first bore 118, and illustratively may comprise a threaded element such as a bolt that engages the threads on the first bore such that rotation of the element 122 adjusts a degree of protrusion of the element 122 from the first section 114 and also may adjust a degree of pressure applied by the element 122 on the respective base ear 118. The bolt of the first pressure element 122 may have a head that is positioned on an opposite side of the first section from the location of the base ear 18.

A second pressure element 124 may be mounted on the second 10 section 116 of the secondary portion and may be configured to apply pressure on one of the base ears 19 of the base mount. The second pressure element 124 may also be configured to exert an adjustable degree of pressure on the base ear 19. The second pressure element may be positioned in the second bore 120, and illustratively comprises a threaded element that engages the threads on the second bore 120 such that rotation of the element 124 adjusts a degree of protrusion or extension of the element 124 from the second bore 120 and may also adjust a degree of pressure applied by the element 124 on the base ear 19 when the stabilizer 20 100 is mounted on the base mount.

In use, the primary portion 102 of the stabilizer 100 may be positioned in the channel of the base mount with the first stabilizer bore 110 in alignment with one of the base bores in the ears of the base mount, as well as one of the boot bores in the boot ears. A fastener 76 may be passed through the aligned bores and a suitable means of retaining the fastener in the bores may be employed, such as a lock pin 78 or a threaded nut mounted on a threaded end of the fastener. The first pressure element 122 and second pressure element 124 may be rotated to a suitable degree to abut against and apply pressure to the respective base ears of the base mount to thereby restrict movement of the fastener 76 in the first stabilizer bore 110 as well as in the base bores of the base ears. The force applied by the stabilizer 100 on the stabilizer and the base ears tends to restrict (and may even prevent) movement of the fastener in the bores of the base and stabilizer, and thereby tends to reduce and may even prevent wear on the base ears of the base mount by the fastener which may cause the base bores to become worn or elongated and otherwise generally loose in fitting the fastener 76 passing therethrough. Wear caused by any movement of the seed boot with respect to the base mount tends to be limited to the seed boot itself (and not the base), which is relatively easier and cheaper to replace than the base mount itself.

The applicant has recognized that positioning the seed boot stabilizer in the channel of the base mount and sizing the stabilizer such that the width of the primary portion of the stabilizer fairly snugly fits between the base ears of the base mount can help to stabilize the seed boot with respect to the base mount, even in cases where the bores in the base ears and/or the seed boot have become distorted or elongated in one dimension due to previous wear and tear on the seed boot and base mount during planting operations. Advantageously, the use of the stabilizer 50 may generally avoid the need to increase the size of the bores, such as the base bores, for receiving bushings or other structures to resize and reshape the damaged bores.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A seed planter system comprising
    an air seeder assembly comprising a base mount having a body and a pair of base ears extending from the body defining a channel therebetween having a channel width, the base ears having a first pair of base bores, the air seeder assembly comprising a seed boot removably mountable on the base mount, the seed boot having a pair of boot ears with a first pair of boot bores;
    a seed boot stabilizer mountable on the seed boot and the base mount, the seed boot stabilizer being positionable in the channel between the seed boot and the base mount, the boot stabilizer having a primary portion with a first stabilizer bore alignable with the first pair of base bores in the base ears;
    a pressure element adjustably mounted on the seed boot stabilizer in a manner permitting adjustment of a degree of pressure exerted by the pressure element on the base mount; and
    a fastener structure extending through the first pair of base bores of the base ears, the first pair of boot bores of the boot ears and the first stabilizer bore to fasten the seed boot stabilizer to the seed boot and the base mount.

2. The system of claim 1 wherein the primary portion of the seed boot stabilizer has a width being substantially equal to the channel width of the base mount to permit a substantially snug fit of the primary portion between the base ears.

3. The system of claim 2 wherein the channel width is defined between opposing inner surfaces of the pair of base ears, and the width of the primary portion is substantially equal to the channel width.

4. The system of claim 1 wherein the seed boot stabilizer includes a secondary portion extending from the primary portion to a position adjacent to one of the base ears; and
    the pressure element is mounted on the secondary portion and configured to apply a degree of pressure to at least one of the base ears of the base mount.

5. The system of claim 1 wherein the pressure element is threadedly mounted on the seed boot stabilizer to apply an adjustable degree of pressure to the at least one base ear by rotating the pressure element.

6. The system of claim 1 wherein the pressure element is configured to apply a biasing force to the fastener to bias the fastener against the base bores of the base ears.

7. The system of claim 1 wherein a pair of said pressure elements are mounted on the seed boot stabilizer to apply an adjustable degree of pressure to both of the base ears of the base mount to apply a biasing force to the fastener to bias the fastener against the base bores of the base ears.

8. The system of claim 1 wherein a mounting of the pressure member is configured to permit adjustment of a degree of extension of the pressure member from the seed boot stabilizer to abut the base mount.

9. The system of claim 1 wherein the pressure element is configured to adjustably abut against at least one of the base ears of the base mount.

10. A method of reducing wear on an air seeder assembly, comprising:
    removing a seed boot from a base mount of an air seeder assembly;
    positioning a seed boot stabilizer on the base mount in a channel formed between base ears of the base mount;
    positioning the seed boot on the base mount with boot ears of the seed boot being positioned adjacent to the base ears;
    extending a fastener through aligned bores of the seed boot, the base mount, and the seed boot stabilizer to connect the seed boot, the base mount, and the seed boot stabilizer; and
    adjusting a position of a pressure element mounted on the seed boot stabilizer to increase a degree of pressure applied by the pressure element on the base mount.

11. The method of claim 10 wherein adjusting the position of the pressure element includes increasing a degree of extension of the pressure element from the seed boot stabilizer to press against at least one of the base ears of the base mount.

12. The method of claim 10 wherein the channel between the base ears has a channel width, and the seed boot stabilizer has a width; and including
    sizing the width of the stabilizer to the channel width to provide a snug fit for the stabilizer in the channel.

13. The method of claim 10 wherein the seed boot stabilizer has a primary portion and secondary portion; and including
    positioning the primary portion of the seed boot stabilizer between the base ears of the base mount and positioning the secondary portion of the seed boot stabilizer outside of the base ears of the base mount.

14. The method of claim 13 including positioning the secondary portion of the stabilizer outside of one of the boot ears of the seed boot.

15. The method of claim 10 additionally comprising aligning bores on the base ears, the boot ears and the stabilizer to permit the fastener to be passed through the aligned bores.

16. A seed planter system comprising
    an air seeder assembly comprising a base mount having a body and a pair of base ears extending from the body defining a channel therebetween having a channel width, the base ears having a first pair of base bores, the air seeder assembly comprising a seed boot removably mountable on the base mount, the seed boot having a pair of boot ears with a first pair of boot bores;
    a seed boot stabilizer mountable on the seed boot and the base mount, the seed boot stabilizer being positionable in the channel between the seed boot and the base mount, the boot stabilizer having a primary portion with a first stabilizer bore alignable with the first pair of base bores in the base ears; and
    a fastener structure extending through the first pair of base bores of the base ears, the first pair of boot bores of the boot ears and the first stabilizer bore to fasten the seed boot stabilizer to the seed boot and the base mount;
    wherein the seed boot stabilizer includes a secondary portion extending from the primary portion to a position adjacent to one of the base ears, and a pressure element mounted on the secondary portion and configured to apply a degree of pressure to at least one of the base ears of the base mount.

17. The system of claim 16 wherein the pressure element is configured to apply an adjustable degree of pressure to the at least one base ear.

18. The system of claim 16 wherein the pressure element is configured to apply a biasing force to the fastener to bias the fastener against the base bores of the base ears.

19. The system of claim 16 wherein a pair of said pressure elements are mounted on the secondary portion and configured to apply an adjustable degree of pressure to both of the base ears of the base mount to apply a biasing force to the fastener to bias the fastener against the base bores of the base ears.

* * * * *